US012701394B1

(12) United States Patent
Conlon

(10) Patent No.: US 12,701,394 B1
(45) Date of Patent: Aug. 4, 2026

(54) CONTEXTUAL AUDIO PROCESSING SYSTEM AND METHODS OF USE THEREOF

(71) Applicant: Medik Inc., Dover, DE (US)

(72) Inventor: Patrick Conlon, Manchester Center, VT (US)

(73) Assignee: Medik Inc., Dover, DE (US)

( * ) Notice: Subject to any disclaimer, the term of this patent is extended or adjusted under 35 U.S.C. 154(b) by 0 days.

(21) Appl. No.: 19/263,128

(22) Filed: Jul. 8, 2025

(51) Int. Cl.
*H04W 4/90* (2018.01)
*H04W 4/021* (2018.01)
*H04W 12/033* (2021.01)

(52) U.S. Cl.
CPC ............. *H04W 4/90* (2018.02); *H04W 4/021* (2013.01); *H04W 12/033* (2021.01)

(58) Field of Classification Search
CPC ....... H04W 4/90; H04W 76/50; H04W 4/021; H04W 12/64; H04W 40/20; H04W 4/02; H04W 64/00; H04W 64/003; H04W 4/029; H04W 48/04
See application file for complete search history.

(56) References Cited

U.S. PATENT DOCUMENTS

| | | | |
|---|---|---|---|
| 12,082,071 B2 | 9/2024 | Woo et al. | |
| 12,165,238 B2 | 12/2024 | Luu et al. | |

| | | | | |
|---|---|---|---|---|
| 2008/0274761 A1 * | 11/2008 | Block | ............... | H04M 3/42365 |
| | | | | 455/517 |
| 2014/0327547 A1 * | 11/2014 | Johnson | .................. | H04L 67/53 |
| | | | | 340/601 |
| 2021/0204107 A1 * | 7/2021 | Lindholm | ............... | G06F 40/58 |
| 2023/0336958 A1 | 10/2023 | Mehta et al. | | |
| 2024/0095968 A1 * | 3/2024 | Luu | ......................... | G06T 11/00 |
| 2024/0147185 A1 | 5/2024 | Marko | | |
| 2025/0008015 A1 * | 1/2025 | Amir | ................. | H04M 1/72436 |
| 2025/0142309 A1 * | 5/2025 | Fucci | ...................... | H04W 4/90 |
| 2025/0159453 A1 * | 5/2025 | Martin | ................... | H04W 4/12 |
| 2025/0358366 A1 * | 11/2025 | Olejar | ................ | H04M 3/5183 |

* cited by examiner

*Primary Examiner* — Jinsong Hu
*Assistant Examiner* — Justin Barry
(74) *Attorney, Agent, or Firm* — Lennie Bersh; Greenberg Traurig, LLP

(57) ABSTRACT

In some embodiments, the present disclosure provides a command and control system for emergency response communications that may include utilizing a plurality of mobile devices to capture and transmit voice and video data over a wireless network; establishing wireless connections with a central processing unit via a communication interface; dynamically extracting contextual information from voice communications through a real-time audio processing engine to identify emergency events and determine directional data; analyzing the contextual information via a role-based filtering module to generate filtered communication alerts for designated devices; creating a real-time display with dynamically generated markers via a geospatial situational awareness module; providing open and targeted audio channels through a dual-channel audio subsystem; and ensuring secure transmission of data through an encryption module.

18 Claims, 7 Drawing Sheets

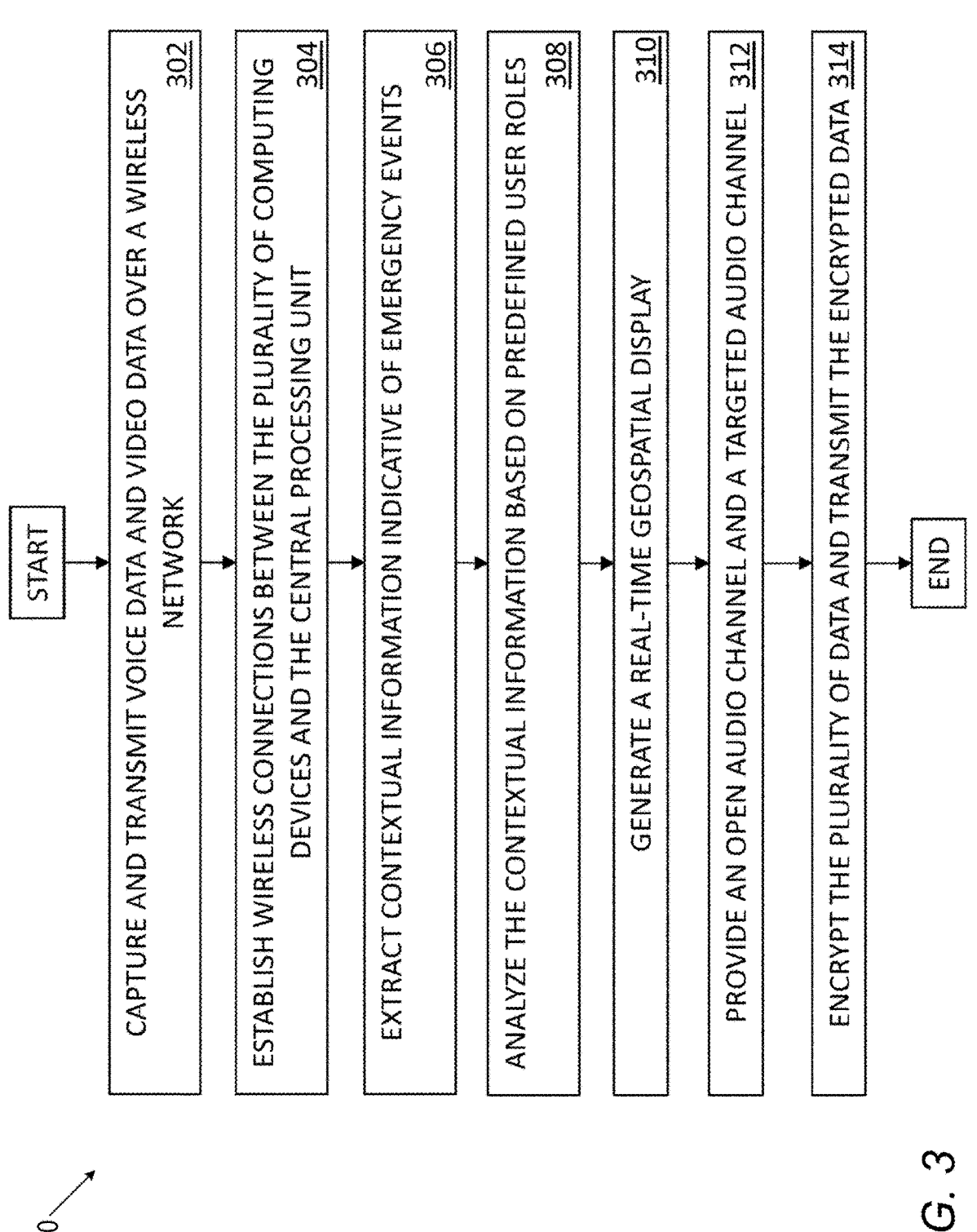

START

CAPTURE AND TRANSMIT VOICE DATA AND VIDEO DATA OVER A WIRELESS NETWORK 302

ESTABLISH WIRELESS CONNECTIONS BETWEEN THE PLURALITY OF COMPUTING DEVICES AND THE CENTRAL PROCESSING UNIT 304

EXTRACT CONTEXTUAL INFORMATION INDICATIVE OF EMERGENCY EVENTS 306

ANALYZE THE CONTEXTUAL INFORMATION BASED ON PREDEFINED USER ROLES 308

GENERATE A REAL-TIME GEOSPATIAL DISPLAY 310

PROVIDE AN OPEN AUDIO CHANNEL AND A TARGETED AUDIO CHANNEL 312

ENCRYPT THE PLURALITY OF DATA AND TRANSMIT THE ENCRYPTED DATA 314

END

CONTEXTUAL AUDIO PROCESSING SYSTEM AND METHODS OF USE THEREOF

FIELD OF TECHNOLOGY

The present disclosure generally relates to emergency response communication systems and methods of use thereof.

BACKGROUND OF TECHNOLOGY

Typically, effective communication serves as an important aspect in emergency response scenarios, yet many existing systems continue to rely on single-channel audio and manually operated interfaces, which hinder rapid decision-making. Multiple studies have indicated that conventional approaches often encounter difficulties in combining real-time data with tools that are easy to use. This limitation creates challenges for responders in promptly assessing situations and coordinating their efforts, thereby increasing the risk of delayed actions during crises.

Over time, high-pressure environments have highlighted the challenges posed by information overload and ambiguous message delivery, both of which further complicate response efforts. Observations indicate that systems requiring redundant inputs and lacking intelligent filtering often lead to miscommunication and inefficient use of limited resources. As a result, there is a clear need for advancements that improve the relay of important information, minimize manual intervention, and enhance the overall clarity and reliability of emergency communications in dynamic situations.

SUMMARY OF DESCRIBED SUBJECT MATTER

In one embodiment, the disclosure includes a computer-implemented method including utilizing, by at least one processor, a plurality of mobile devices, each configured to capture and transmit voice and video data over a wireless network; establishing, by the at least one processor and via a communication interface, wireless connections between the plurality of mobile devices and a central processing unit; processing, by a real-time audio processing engine operatively coupled to the communication interface, received voice communications from the mobile devices to extract contextual information indicative of triggering events and to determine directional data based on inputs from multiple devices; analyzing, by a role-based filtering module operatively coupled to the audio processing engine, the contextual information according to predefined user roles and generating filtered communication alerts for designated computing devices; generating, by a geospatial situational awareness module operatively coupled to the communication interface, a real-time geospatial display that includes dynamically generated mapping tools associated with the filtered communication alerts and that is adjusted based on the determined directional data; providing, by a dual-channel audio subsystem operatively coupled to the communication interface, an open audio channel for receiving all voice communications and a targeted audio channel for delivering the filtered, role-specific communications; and encrypting, by an encryption module operatively coupled to the communication interface, the voice, video, and contextual data and securely transmitting the same over the wireless network.

In another embodiment, the disclosure includes a system including a non-transient computer memory, storing software instructions; at least one or more components of at least one processor configured to execute the software instructions that cause the at least one processor to perform steps to: utilize a plurality of computing devices, each configured to capture and transmit voice data and video data over a wireless network; establish, via a communication interface, wireless connections between the plurality of computing devices and a central processing unit; extract contextual information indicative of triggering events and determine directional data based on inputs from the plurality of computing devices; analyze the contextual information according to at least one predefined user role to generate at least one filtered communication alert; generate, via a geospatial situational awareness module operatively coupled to the communication interface, a plurality of real-time geospatial mapping tools associated with the filtered communication alerts, where the geospatial awareness module displays the plurality of real-time geospatial mapping tools adjusted based on the determined directional data; utilize a dual-channel audio subsystem to provide an open audio channel for a plurality of voice communications and a targeted audio channel for delivering the filtered, role-specific communications; and encrypt the voice data, the video data, and the contextual information to securely transmit over the wireless network.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 3 is a flowchart illustrating operational steps for utilizing a dual-channel audio subsystem to provide an open audio channel and a targeted audio channel, in accordance with one or more embodiments of the present disclosure.

DETAILED DESCRIPTION

Figure 1:
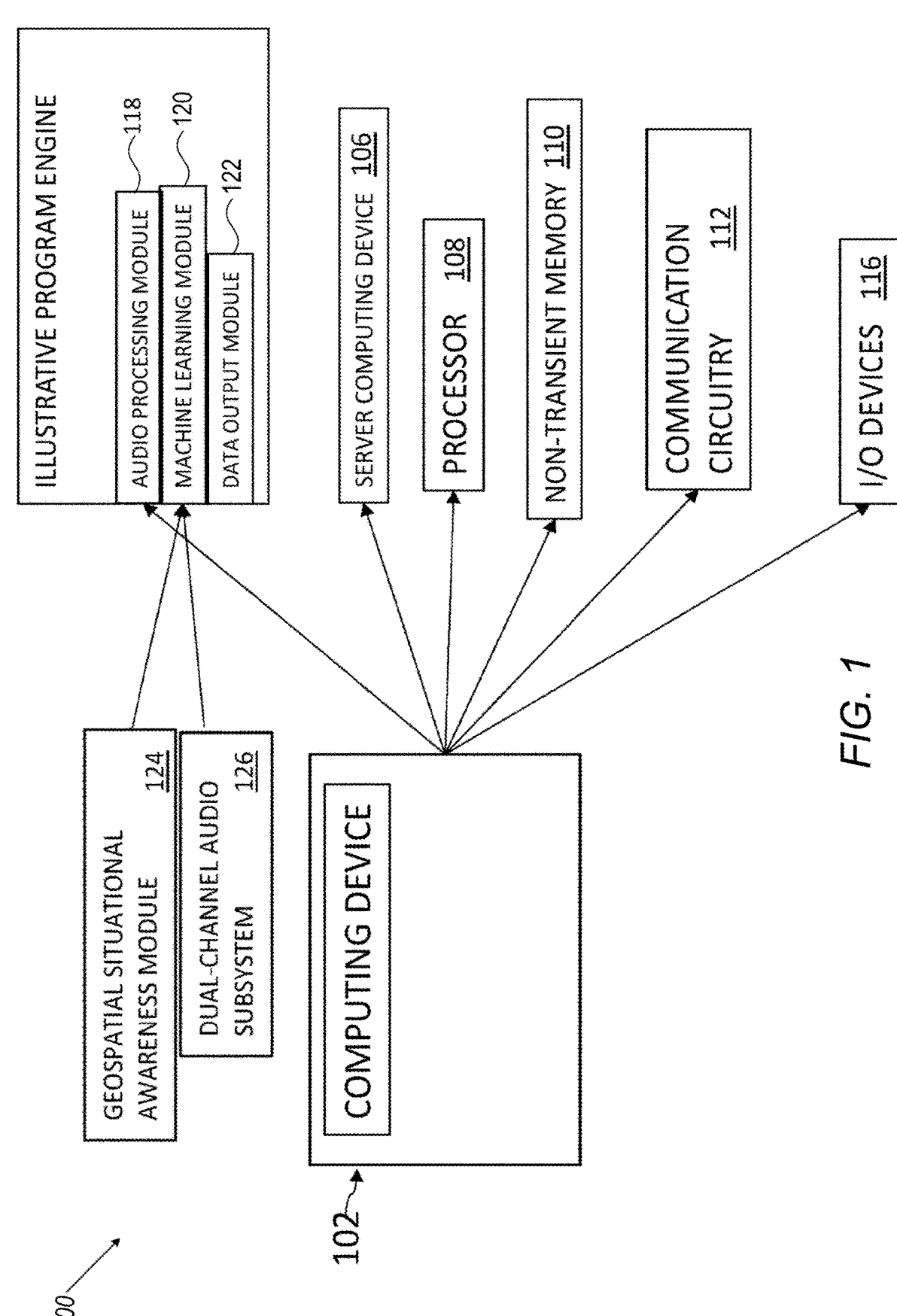
FIG. 1 depicts a block diagram of an exemplary computer-based system and platform for generating a real-time geo-spatial display that includes a plurality of real-time geospatial mapping tools associated with filtered communication alerts, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

The present detailed description pertains to systems and methods for enhancing emergency response communications and situational awareness, particularly through the use of advanced audio processing, geospatial integration, and role-based information delivery. The described technology is broadly applicable to command and control systems for first responders, including police, firefighters, EMTs, and other emergency personnel, and is designed to improve operational efficiency, interoperability, and real-time decision-making during significant events. While the examples provided herein focus on specific implementations, they are intended to be illustrative and not limiting, as the described technology may be adapted to various contexts and applications.

The following explanation acknowledges that certain widely recognized elements, processes, and techniques may be omitted or described with less detail to maintain clarity in the disclosure. Additionally, the embodiments described in this document are provided as illustrations, and various modifications, rearrangements, or substitutions of components and steps may be implemented without deviating from the scope of the described subject matter. The claims appended to this document are intended to cover all such variations and adaptations that align with the principles and scope of the disclosed subject matter.

FIG. 1 depicts a block diagram of an exemplary computer-based system and platform for generating a real-time geo-spatial display that includes dynamically generated markers associated with filtered communication alerts, in accordance with one or more embodiments of the present disclosure.

In some embodiments, a computing system 100 may include a computing device 102 associated with a user and an illustrative program engine 104. In some embodiments, the program 108 may be stored on the computing device 102 such as, without limitation a geo-spatial mapping-enabled computing device (e.g., smart phone, iPad™ with calling capability, laptop with calling capability, etc.). In some embodiments, the illustrative program engine 104 may reside, partially or in full, on a server computing device 106. In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, a second or external computing device (not shown) may communicate with the computing device 102.

In some embodiments, the illustrative program engine 104 may be configured to instruct the processor 108 to execute one or more software modules such as an audio processing module 118, a machine learning module 120, and a data output module 122.

In some embodiments, an exemplary audio processing module 118, of the present disclosure, utilizes at least one machine learning algorithm described herein, to capture and transmit voice and video data over a wireless network. In some embodiments, the audio processing module 118 can utilize a communication interface to establish at least one wireless connection of a plurality of wireless connections between the plurality of computing devices 102 and a central processing unit. In some embodiments, the exemplary audio processing module 118 can process received voice communications from the plurality of computing devices 102 to extract contextual information indicative of emergency events and determine directional data based on inputs associated with the plurality of computing devices 102. In some embodiments, the exemplary audio processing module 118 can analyze the contextual information in response to pre-defined user parameters to filer the contextual information, where the exemplary audio processing module 118 utilizes the filtered contextual information to generate communication alerts for one or more computing devices of the plurality of computing devices 102. In some embodiments, the exemplary audio processing module 118 can utilize a geospatial situational awareness module 124 coupled to the communication interface to generate a real-time geospatial display, where the geospatial display includes a plurality of real-time geospatial mapping tools (i.e., a plurality of dynamically generated markers) associated with the filtered communication alerts and adjusts the geospatial display based on the directional data. In some embodiments, the exemplary audio processing module 118 can provide, via a dual-channel audio subsystem 126 operatively coupled to the communication interface, an open audio channel for receiving all voice communications and a targeted audio channel for delivering role-specific communications to one or more computing devices. In some embodiments, the audio processing module 118 can encrypt the voice data, video data, and contextual information to securely transmit the data over the wireless communication network 114.

In certain embodiments, the plurality of computing devices 102 can refer to one or more commercially available smartphones equipped with integrated global positioning system receivers, and the plurality of computing devices 102 may be configured to optimize battery consumption for continuous operation over a predetermined period of time. In certain embodiments, the plurality of computing devices may be equipped with country specific global satellite navigation systems (i.e., GLONASS, Galileo, BeiDou, QZSS, and/or NavIC), cell power triangulation, wi-fi positioning system, Bluetooth low energy beacons, ultra-wide-band, RFID, NFC, inertial navigation systems, real-time kinematic systems, assisted GPS, and/or visual position systems. In some embodiments, the exemplary audio processing module 118 can identify one or more location sensors associated with the plurality of computing devices 102, where the one or more location sensors can generate real-time geospatial coordinates to the geospatial situational awareness module 124. In some embodiments, the exemplary audio processing module 118 can perform the contextual filtering of received voice communications to eliminate duplicate communications and extract emergency event information of immediate importance. In certain embodiments, the term immediate importance may refer to contextual information that would allow an individual within a predefined user role responder to make an instantaneous determination of assistance to a particular location. In certain embodiments, the role-based filtering module can be configured to generate filtered communication alerts based on predefined user roles, where these predefined user roles may include emergency responders, law enforcement officers, military, private security, logistics companies, medical personnel, and/or other users of radios. In certain embodiments, the dual-channel audio subsystem 126 can deliver the filtered role-specific communication via a targeted audio channel and ensure a transmission delay that does not exceed two seconds. In certain embodiments, the exemplary audio processing module 118 can securely encrypt the voice, video, and contextual data via AES-128, AES-256, and/or other higher encryption protocols. In certain embodiments, the exemplary audio processing module 118 may include a user interface operatively associated with each computing device 102 of the plurality of computing devices, where the user interface displays incident reports, dynamically generated markers, and/or geospatial information derived from the geospatial situational awareness module 124. In some embodiments, the exemplary audio processing module 118 can include a communication interface configured to establish wireless connection via at least one of 3G cellular networks, 4G cellular networks, 5G networks, wi-fi, L/S band radios, and/or other forms of wireless communications. In some embodiments, the exemplary audio processing module 118 can include a plurality of mapping tools (i.e., dynamically generated markers) to be displayed in augmented reality and/or virtual reality systems via a plurality of graphical user interface elements. In certain embodiments, the exemplary audio processing module 118 to leverage one or more APIs to other services to enable the transmission audio data associated with the triggering event. In certain embodiments, the exemplary audio processing module 118 can include lambda deployments where the application is server less to reflect more modern architectures.

Figure 2:
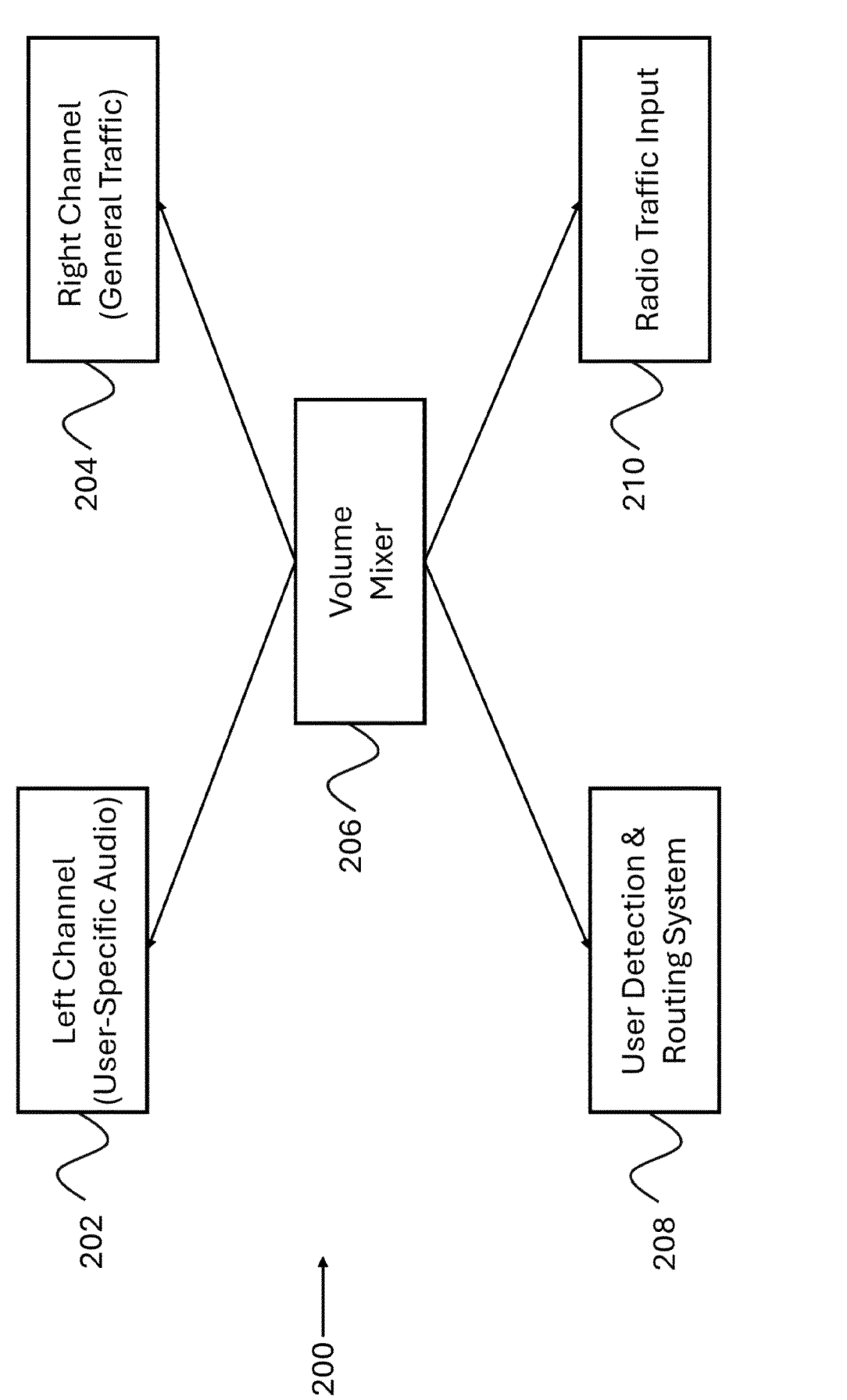
FIG. 2 illustrates an audio system block diagram designed to enhance radio communication clarity by leveraging a stereo audio configuration, in accordance with one or more embodiments of the present disclosure.

FIG. 2 illustrates an audio system block diagram 200 designed to enhance radio communication clarity by leveraging a stereo audio configuration, in accordance with one or more embodiments of the present disclosure.

In some embodiments, the audio system 200 is structured to separate and manage audio streams to improve situational awareness and ensure user-specific communication. In certain embodiments, the audio system may include components configured to segregate and process audio streams for targeted and general purposes.

In some embodiments, the left channel 202 can be designated for user-specific audio. In certain embodiments, the left channel 202 may be configured to deliver targeted communications that are filtered and directed to the user based on their role and responsibilities. For example, in certain embodiments, updates or instructions of significant importance relevant to a specific user, such as an EMT or a SWAT commander, may be routed through the left channel 202 to ensure focused and uninterrupted delivery.

In some embodiments, the right channel 204 can be assigned for general traffic. As a result, this channel is configured to provide a communication stream that includes non-specific or general audio traffic. In certain embodiments, the right channel 204 may ensure that users remain aware of the broader operational context without being overwhelmed by irrelevant or redundant information.

In some embodiments, both the left channel 202 and the right channel 204 may be coupled to a volume mixer 206. In certain embodiments, the volume mixer 206 can be configured to allow dynamic adjustment of audio levels between the two channels, thereby enabling users to prioritize one channel over the other based on operational conditions. For example, during an event requiring heightened attention, the user may increase the volume of the left channel 202 while reducing the volume of the right channel 204 to focus attention on role-specific instructions. In certain embodiments, the left channel 202 and the right channel 204 can be merged into a singular channel, where this singular channel can be an open channel or a closed channel depending on the context of the triggering event.

In some embodiments, a user detection and routing system 208 can be incorporated into the operation of the audio system. In certain embodiments, the system may be configured to identify the user and their associated role within the communication network. In certain embodiments, the system may route appropriate audio streams to the left channel 202 and the right channel 204 in real-time to ensure that the user receives the most pertinent information without delay. In certain embodiments, the user detection and routing system 208 can select the left channel 202 or the right channel 204 to hear. In other embodiments, the user detection and routing system 208 can stream each channel in a side of a stereo. For example, the user detection and routing system 208 can stream the left channel 202 on the left side of a stereo and stream the right channel 204 on the right side of a stereo.

In some embodiments, radio traffic input 210 may serve as the primary source of audio data for the system. In certain embodiments, the radio traffic input 210 may be configured to capture all incoming radio communications and feed them into the user detection and routing system 208, wherein the radio traffic input 210 can process contextual information used to determine the appropriate channel for each audio stream.

In some embodiments, the stereo audio system can provide a dual-channel approach to communication. In certain embodiments, by separating audio streams and enabling user-specific routing, the system enhances clarity, reduces cognitive load, and improves the overall efficiency of communication in high-stakes environments.

In certain embodiments, the exemplary audio processing module 118 may enhance communication, situational awareness, and operational efficiency for any individual within the predefined user roles. In some embodiments, the exemplary audio processing module 118 may leverage advanced processing of a trained machine learning module 120; filtering of video data, voice data, and contextual information; and communication via the data output module 122 to support effective emergency management.

For example, the exemplary audio processing module 118 may utilize the at least one processor 104 of a plurality of computing devices, each computing device 102 can be configured to capture and transmit voice and video data over a wireless network. In certain embodiments, these mobile computing devices 102 may serve as the primary data collection points, thereby enabling real-time communication and multimedia data sharing among first responders.

FIG. 3 is a flowchart illustrating operational steps for utilizing a dual-channel audio subsystem to provide an open audio channel and a targeted audio channel, in according with one or more embodiments of the present disclosure.

In step 302, the illustrative processor 104 associated with the computing device 102 can capture and transmit voice and video data over a wireless network. In some embodiments, the illustrator processor 104 can utilize the plurality of computing devices 102 to capture and transmit the voice and video data over the wireless network. In certain embodiments, the plurality of computing devices 102 can include commercially available smartphones that include integrated Global Positioning System (GPS) receivers.

In step 304, the illustrative processor 104 can establish wireless connections between the plurality of computing devices and a central processing unit. In some embodiments, the illustrative processor 104 can further establish, via a communication interface, wireless connections between the plurality of mobile devices and the central processing unit. In certain embodiments, these wireless connections can facilitate seamless integration of all devices into a unified network, thereby enabling centralized data processing and coordination.

In step 306, the illustrative processor 104 can extract contextual information indicative of emergency events. In some embodiments, the illustrative processor 104 can process received voice communications from the plurality of computing devices 102 by employing a real-time audio processing engine operatively coupled to the communication interface. In some embodiments, this processing extracts contextual information indicative of emergency events and determines directional data based on inputs from multiple devices, which is significant for identifying actionable insights from raw audio data and improving situational awareness.

In step 308, the illustrative processor 104 can analyze the contextual information based on predefined user roles. In some embodiments, the illustrative processor 104 can subsequently analyze, by a role-based filtering module operatively coupled to the audio processing engine, the contextual information in accordance with predefined user roles. In certain embodiments, based on this analysis, the illustrative processor 104 may generate filtered communication alerts for designated mobile devices, ensuring that only relevant information is delivered to appropriate users, thereby reducing information overload and improving decision-making efficiency. In certain embodiments, the audio processing engine may perform these functions in real time; perform contextual filtering of received voice communications to eliminate redundant messages; and extract emergency event information of significant importance.

In step 310, the illustrative processor 104 can generate a real-time geospatial display. In certain embodiments, the illustrative processor 104 can generate, by a geospatial situational awareness module 124 operatively coupled to the communication interface, a real-time geospatial display. In some embodiments, this real-time geospatial display may include dynamically generated markers associated with the filtered communication alerts and may be adjusted based on the determined directional data, which provides a visual representation of the emergency scenario and thereby enables emergency responders to quickly assess and respond to the situation.

In step 312, the illustrative processor 104 can provide an open audio channel and a targeted audio channel. In some embodiments, the illustrative processor 104 can further provide, by a dual-channel audio subsystem 126 operatively coupled to the communication interface, an open audio channel for receiving all voice communications and a targeted audio channel for delivering filtered, role-specific communications. In certain embodiments, this dual-channel approach ensures that important information is not missed while maintaining a streamlined communication flow tailored to individual roles.

In step 314, the illustrative processor 104 can encrypt the plurality of data and transmit the encrypted data. In certain embodiments, the illustrative processor 104 can perform encryption, by an encryption module operatively coupled to the communication interface, on the voice, video, and contextual data before securely transmitting the same over the wireless network. In some embodiments, this encryption helps maintain the confidentiality and integrity of the transmitted data, which supports security in emergency response operations.

In some embodiments, the illustrative processor 104 can conclude with a successful execution of all described steps, thereby resulting in a robust and efficient emergency response system. In certain embodiments, the illustrative processor 104 can utilize one or more location sensors to generate the real-time geospatial coordinates used by the geospatial situational awareness module to update the real-time geospatial display. In certain embodiments, the illustrative processor 104 can utilize a user interface to display the plurality of incident reports, the plurality dynamically generated markers (i.e., mapping tools), and/or the geospatial information derived from the geospatial situational awareness module 124. In certain embodiments, the plurality of mapping tools (i.e., dynamically generated markers) can be displayed in augmented reality and/or virtual reality systems via a plurality of graphical user interface elements. In certain embodiments, the illustrative processor 104 can utilize the exemplary audio processing module 118 to leverage one or more APIs to other services to enable the transmission audio data associated with the triggering event.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others. For the purposes of this disclosure, a quantum computing device is considered to be a computing device.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, quantum computers, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, quantum computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the audio processing module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 3 (e.g., but not limited to, 100-999), at least 1,000 (e.g., but not limited to, 1,000-9, 999), at least 10,000 (e.g., but not limited to, 10,000-99, 999), at least 100,000 (e.g., but not limited to, 100,000-999, 999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000, 000 (e.g., but not limited to, 1,000,000,000-999,999,999, 999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, quantum encryption, post-quantum encryption, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 4:
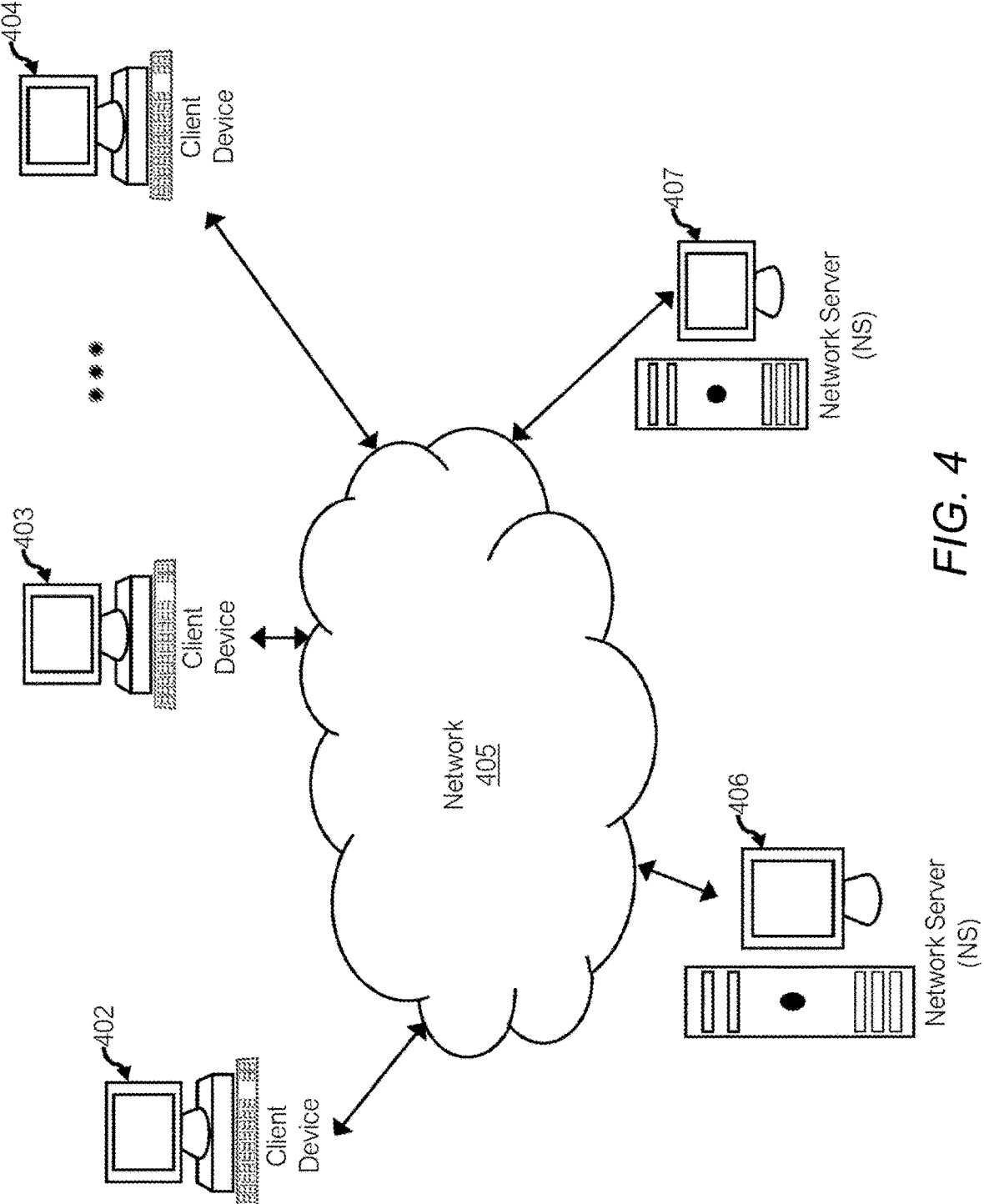
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates various strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the audio processing module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, quantum computers, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may run one or more applications, such as Internet browsers, mobile applications, voice calls, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++, APIs, and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/ or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, web-based chat services, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), other software modules, and/or any combination thereof.

Figure 5:
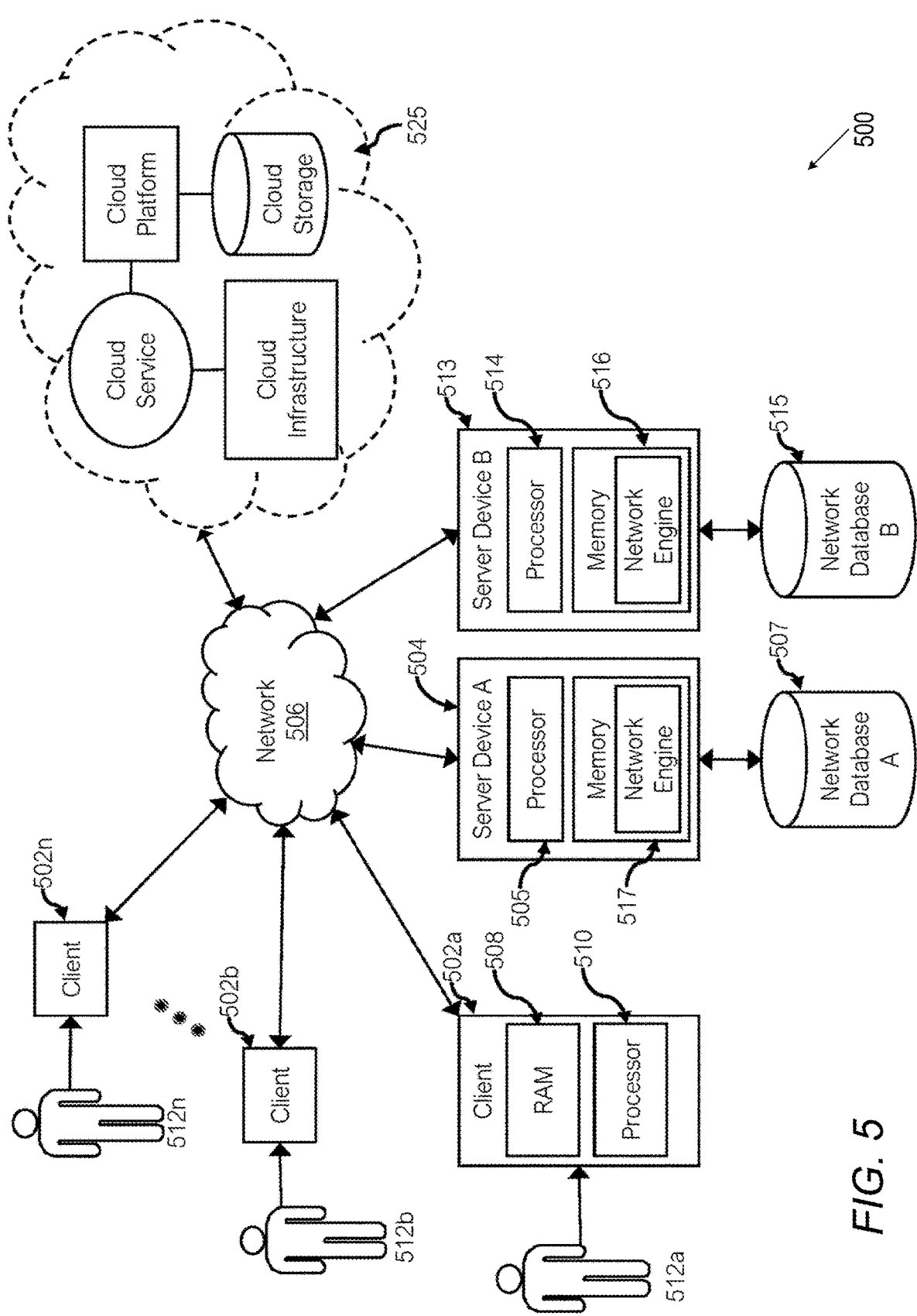
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, MacOS, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
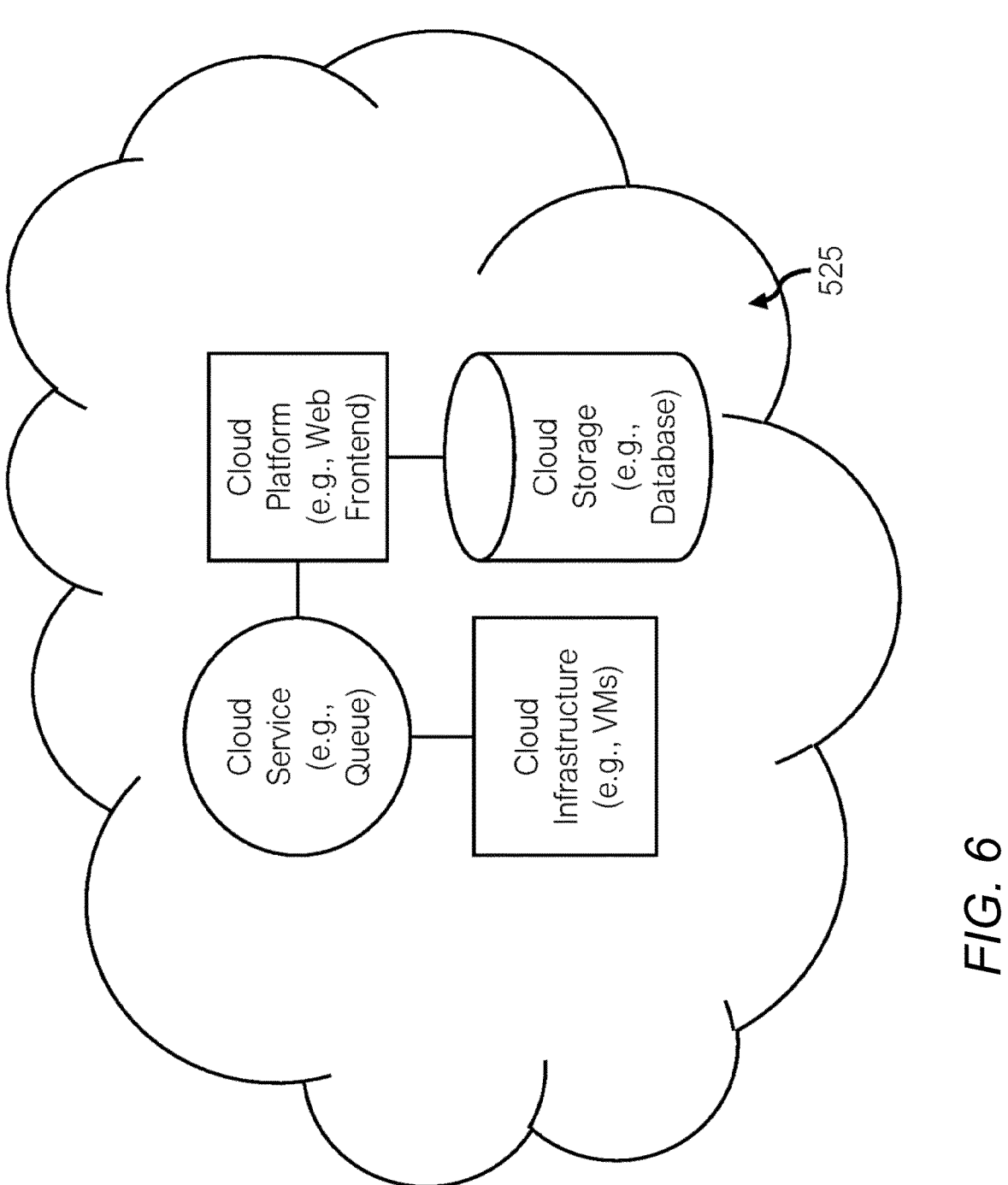
FIGS. 6 and 7 are diagrams illustrating implementations of cloud computing architecture/aspects with respect to which the disclosed technology may be specifically configured to operate, in accordance with one or more embodiments of the present disclosure.
Figure 7:
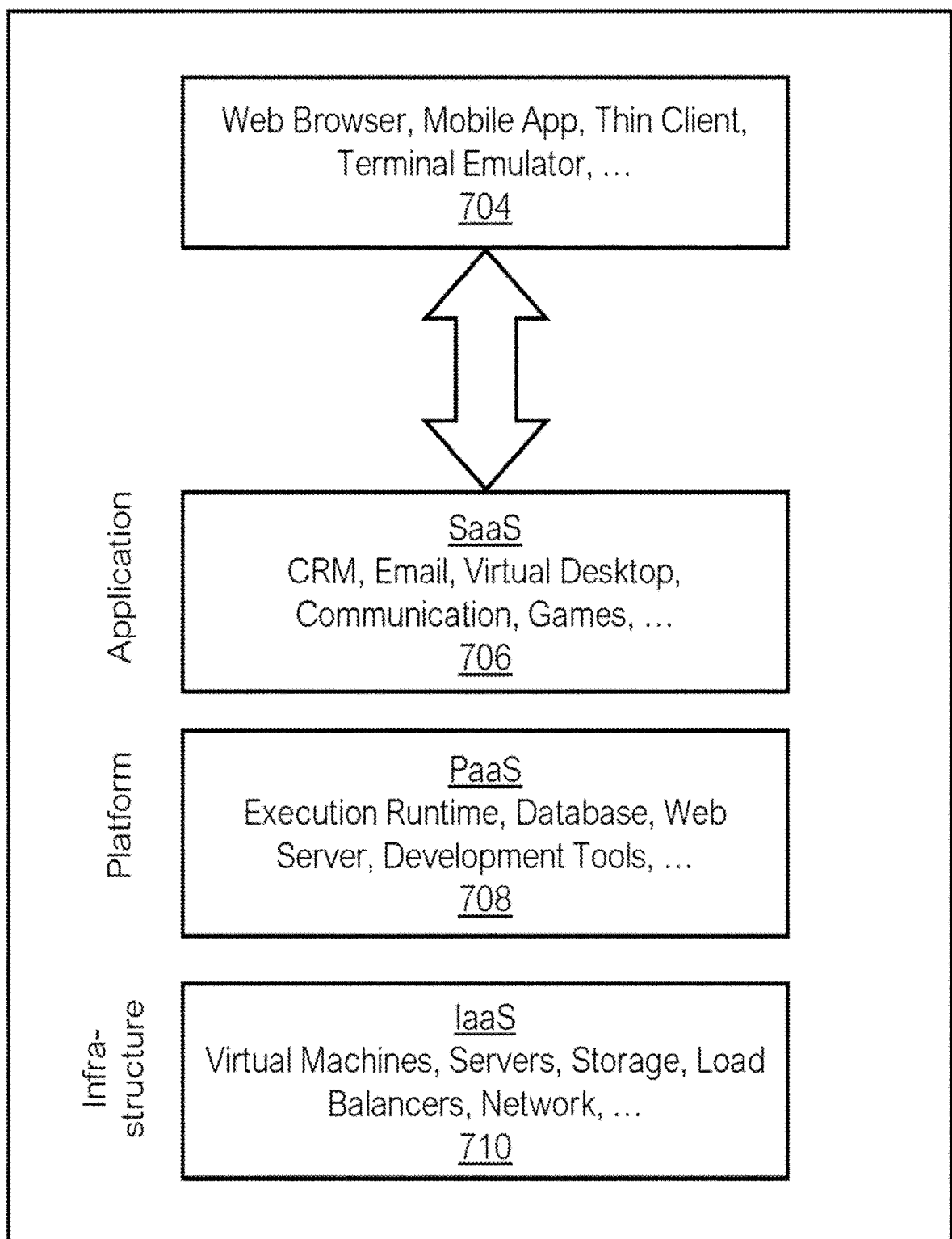

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLS™") model, feed-forward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A computer-implemented method may include: utilizing, by at least one processor, a plurality of computing devices, each configured to capture and transmit voice data and video data over a wireless network; establishing, by the at least one processor and via a communication interface, wireless connections between the plurality of computing devices and a central processing unit; extracting, by the at least one processor, contextual information indicative of triggering events and determine directional data based on inputs from the plurality of computing devices; analyzing, by the at least one processor, the contextual information according to at least one predefined user role to generate at least one filtered communication alert; generating, by the at least one processor and via a geospatial situational awareness module operatively coupled to the communication interface, a plurality of real-time geospatial mapping tools associated with the filtered communication alerts, where the geospatial awareness module displays the plurality of real-time geospatial mapping tools adjusted based on the determined directional data; utilizing a dual-channel audio subsystem, by the at least one processor, to provide an open audio channel for a plurality of voice communications and a targeted audio channel for delivering the filtered, role-specific communications; and encrypting, by the at least one processor, the voice data, the video data, and the contextual information to securely transmit over the wireless network.

Clause 2. The method according to clause 1, where the plurality of computing devices are location enabled devices configured to utilize one or more location services.

Clause 3. The method according to clause 1 or 2, where the plurality of real-time geospatial markers comprise a plurality of mapping tools configured to be displayed in at least one of: an augmented reality environment, a virtual environment, and/or a mixed reality environment.

Clause 4. The method according to clause 1, 2 or 3, further including utilizing one or more location sensors coupled to each computing device to generate real-time geospatial coordinates used by the geospatial situational awareness module to update the real-time geospatial display.

Clause 5. The method according to clause 1, 2, 3 or 4, where the real-time audio processing engine further includes: performing contextual filtering of received voice communications to eliminate redundant messages; and extracting emergency event information.

Clause 6. The method according to clause 1, 2, 3, 4 or 5, where the role-based filtering module is configured to generate filtered communication alerts based on predefined user roles selected from: emergency responders; law enforcement officers; military personnel; private security personnel; logistics entities; and/or medical personnel.

Clause 7. The method according to clause 1, 2, 3, 4, 5 or 6, where the dual-channel audio subsystem further includes:

delivering filtered, role-specific communications via the targeted audio channel; and reducing a transmission delay under at least two seconds.

Clause 8. The method according to clause 1, 2, 3, 4, 5, 6 or 7, where the encryption module employs AES-256 encryption to securely encrypt the voice data, the video data, and the contextual information transmitted over the wireless network.

Clause 9. The method according to clause 1, 2, 3, 4, 5, 6, 7, or 8, further including: displaying, via a user interface, at least one incident report, the plurality of real-time geospatial mapping tools, and any geospatial information derived from the geospatial situational awareness module.

Clause 10. The method according to clause 1, 2, 3, 4, 5, 6, 7, 8 or 9, where the communication interface is configured to establish wireless connections via at least one of: 3G cellular networks, 4G cellular networks, and 5G cellular networks.

Clause 11. The method according to clause 1, 2, 3, 4, 5, 6, 7, 8, 9 or 10, where the central processing unit further includes: receiving additional video data and receiving additional contextual information to enhance real-time situational awareness for subsequent events.

Clause 12. A system may include: a non-transient computer memory, storing software instructions; at least one or more components of at least one processor configured to execute the software instructions that cause the at least one processor to perform steps to: utilize a plurality of computing devices, each configured to capture and transmit voice data and video data over a wireless network; establish, via a communication interface, wireless connections between the plurality of computing devices and a central processing unit; extract contextual information indicative of emergency events and determine directional data based on inputs from the plurality of computing devices; analyze the contextual information according to at least one predefined user role to generate at least one filtered communication alert; generate, via a geospatial situational awareness module operatively coupled to the communication interface, a plurality of real-time geospatial mapping tools associated with the filtered communication alerts, where the geospatial awareness module displays the plurality of real-time geospatial mapping tools adjusted based on the determined directional data; utilize a dual-channel audio subsystem to provide an open audio channel for a plurality of voice communications and a targeted audio channel for delivering the filtered, role-specific communications; and encrypt the voice data, the video data, and the contextual information to securely transmit over the wireless network.

Clause 13. The system according to clause 12, where the plurality of real-time geospatial mapping tools comprise a plurality of mapping tools configured to be displayed in at least one of: an augmented reality environment, a virtual environment, and/or a mixed reality environment.

Clause 14. The system according to clause 12 or 13, where the software instructions further include: utilize one or more location sensors coupled to each computing device to generate real-time geospatial coordinates used by the geospatial situational awareness module to update the real-time geospatial display.

Clause 15. The system according to clause 12, 13, or 14, where the real-time audio processing engine further includes: performing contextual filtering of received voice communications to eliminate redundant messages; and extracting emergency event information.

Clause 16. The system according to clause 12, 13, 14, or 15, where the role-based filtering module is configured to generate filtered communication alerts based on predefined user roles selected from: emergency responders; law enforcement officers; military personnel; private security personnel; logistics entities and/or medical personnel.

Clause 17. The system according to clause 12, 13, 14, 15, or 16, where the dual-channel audio subsystem further includes: delivering filtered, role-specific communications via the targeted audio channel; and reducing a transmission delay under at least two seconds.

Clause 18. The system according to clause 12, 13, 14, 15, 16, or 17, where the encryption module employs AES-256 encryption to securely encrypt the voice data, the video data, and the contextual information transmitted over the wireless network.

Clause 19. The system according to clause 12, 13, 14, 15, 16, 17, or 18, where the software instructions further include: utilize a user interface to display the plurality of real-time geospatial mapping tools, and any geospatial information derived from the geospatial situational awareness module.

Clause 20. The system according to clause 12, 13, 14, 15, 16, 17, 18, or 19, where the central processing unit further includes: receiving additional video data and receiving additional contextual information to enhance real-time situational awareness for subsequent events.

What is claimed is:

1. A method, comprising:

establishing, by at least one processor, a plurality of communication channels with a plurality of computing devices associated with a plurality of responders, each computing device configured to capture and transmit voice data and video data over a communication network;

extracting, by the at least one processor, contextual information indicative of triggering events based on inputs from the plurality of computing devices;

determining, by the at least one processor, directional data based on the inputs from the plurality of computing devices;

classifying, by the at least one processor, the contextual information into predefined end-user responder roles for the plurality of responders and generating role-specific filtered communication alerts targeted to the predefined end-user responder roles;

dynamically adjusting, by the at least one processor, in real-time, a plurality of real-time geospatial mapping tools on a plurality of real-time geospatial displays based on:

the role-specific filtered communication alerts, and the directional data;

wherein the plurality of real-time geospatial mapping tools comprises a plurality of dynamically generated markers configured to be displayed in at least one of: an augmented reality environment, a virtual environment, or a mixed reality environment;

wherein the plurality of dynamically generated markers is adjusted based on the directional data; and maintaining, by the at least one processor, a dual-channel audio subsystem that concurrently provides:

a first audio communication channel for open communication between the plurality of responders, and a second audio communication channel for the role-specific filtered communication alerts to at least one designated responder from the plurality of responders based on a predefined end-user responder role of the at least one designated responder;

wherein the dual-channel audio subsystem concurrently maintains the open communication on the first audio communication channel and the role-specific filtered communication alerts on the second audio communication channel by dynamically adjusting relative audio levels using a volume mixer and routing streams in real time to the first audio communication channel and the second audio communication channel based on the predefined end-user responder role of the at least one designated responder.

2. The method of claim 1, wherein the plurality of computing devices are location enabled devices configured to utilize one or more location services.

3. The method of claim 1, further comprising:

using one or more location sensors coupled to each computing device to generate real-time geospatial coordinates to update a real-time geospatial display.

4. The method of claim 1, further comprising:

performing, by the at least one processor, contextual filtering of received voice communications to eliminate redundant messages; and extracting, by the at least one processor, emergency event information.

5. The method of claim 1, further comprising generating, by the at least one processor, filtered communication alerts based on predefined user roles selected from:

emergency responders;

law enforcement officers;

military personnel;

private security personnel;

logistics entities; and medical personnel.

6. The method of claim 1, wherein the dual-channel audio subsystem further comprises:

delivering filtered, role-specific communications via the second audio communication channel; and reducing a transmission delay under at least two seconds, the second audio communication channel.

7. The method of claim 1, further comprising securely encrypting, by the at least one processor, using AES-256 encryption, the voice data, the video data, and the contextual information transmitted over the communication network.

8. The method of claim 1, further comprising:

displaying, via a user interface, at least one incident report, the plurality of real-time geospatial mapping tools, and any geospatial information.

9. The method of claim 1, further comprising establishing, by the at least one processor, at least one wireless connections via at least one of:

at least one 3G cellular networks, at least one 4G cellular networks, or at least one 5G cellular networks.

10. The method of claim 1, further comprising receiving, by the at least one processor, additional video data and additional contextual information to enhance real-time situational awareness for subsequent events.

11. A system, comprising:

a non-transient computer memory; storing software instructions; and at least one processor configured to execute the software instructions that causes the at least one processor to:

establish a plurality of communication channels with a plurality of computing devices associated with a plurality of responders, each computing device configured to capture and transmit voice data and video data over a communication network;

extract contextual information indicative of triggering events based on inputs from the plurality of computing devices;

determine directional data based on the inputs from the plurality of computing devices;

classify the contextual information into predefined end-user responder roles for the plurality of responders and generating role-specific filtered communication alerts targeted to the predefined end-user responder roles;

dynamically adjust in real-time, a plurality of real-time geospatial mapping tools on a plurality of real-time geospatial displays based on:

the role-specific filtered communication alerts, and the directional data;

wherein the plurality of real-time geospatial mapping tools comprises a plurality of dynamically generated markers configured to be displayed in at least one of:

an augmented reality environment, a virtual environment, or a mixed reality environment;

wherein the plurality of dynamically generated markers is adjusted based on the directional data; and maintain a dual-channel audio subsystem that concurrently provides:

a first audio communication channel for open communication between the plurality of responders, and a second audio communication channel for the role-specific filtered communication alerts to at least one designated responder from the plurality of responders based on a predefined end-user responder role of the at least one designated responder;

wherein the dual-channel audio subsystem concurrently maintains the open communication on the first audio communication channel and the role-specific filtered communication alerts on the second audio communication channel by dynamically adjusting relative audio levels using a volume mixer and routing streams in real time to the first audio communication channel and the second audio communication channel based on the predefined end-user responder role of the at least one designated responder.

12. The system of claim 11, wherein the at least one processor is further configured to use one or more location sensors coupled to each computing device to generate real-time geospatial coordinates to update a real-time geospatial display.

13. The system of claim 11, wherein the at least one processor is further configured to:

perform contextual filtering of received voice communications to eliminate redundant messages; and extract emergency event information.

14. The system of claim 11, wherein the at least one processor is further configured to generate filtered communication alerts based on predefined user roles selected from:

emergency responders;

law enforcement officers;

military personnel;

private security personnel;

logistics entities; and medical personnel.

15. The system of claim 11, wherein the dual-channel audio subsystem further comprises:

delivering filtered, role-specific communications via the second audio communication channel; and reducing a transmission delay under at least two seconds.

16. The system of claim 11, wherein the at least one processor is further configured to securely encrypt using AES-256 encryption, the voice data, the video data, and the contextual information transmitted over the communication network.

17. The system of claim 11, wherein the at least one processor is further configured to use a user interface to display the plurality of real-time geospatial mapping tools, and any geospatial information.

18. The system of claim 11, wherein at least one processor is further configured to receive additional video data and additional contextual information to enhance real-time situational awareness for subsequent events.

* * * * *